(12) United States Patent  (10) Patent No.: US 6,518,537 B1
Tezawa  (45) Date of Patent: Feb. 11, 2003

(54) WELDING ELECTRODE TIP DRESSING APPARATUS

(75) Inventor: Kazuhiro Tezawa, Nagoya (JP)

(73) Assignee: Kyokutoh Company, Aichi-gun (JP)

( * ) Notice: Subject to any disclaimer, the term of this patent is extended or adjusted under 35 U.S.C. 154(b) by 0 days.

(21) Appl. No.: 09/940,154

(22) Filed: Aug. 27, 2001

(51) Int. Cl.⁷ .............................. H05B 3/03; B23K 9/32; B21D 3/02; B23P 19/00
(52) U.S. Cl. ..................... 219/119; 219/86.8; 29/762; 29/402.19; 72/112
(58) Field of Search ................. 219/119, 86.8, 219/86.1, 86.25, 69.15, 69.17; 29/762, 402.19; 409/140, 181; 72/112

(56) References Cited

U.S. PATENT DOCUMENTS

| | | | |
|---|---|---|---|
| 3,748,427 A | * 7/1973 | Baldwin | 219/69.15 |
| 4,041,272 A | * 8/1977 | Burton et al. | 219/108 |
| 4,578,005 A | 3/1986 | Fuse | |
| 4,610,153 A | * 9/1986 | Nedorezov | 219/119 |
| 4,737,611 A | * 4/1988 | Humblot | 219/119 |
| 4,771,577 A | 9/1988 | Abe et al. | |
| 4,842,456 A | 6/1989 | Saito | |
| 4,892,448 A | 1/1990 | Hoch et al. | |
| 4,935,595 A | 6/1990 | Fuse | |
| 4,972,047 A | * 11/1990 | Puddle et al. | 219/118 |
| 4,999,475 A | * 3/1991 | Yasuge | 219/86.41 |
| 5,073,692 A | * 12/1991 | Jackson et al. | 219/86.7 |
| 5,288,185 A | 2/1994 | Mattsson | |
| 5,332,342 A | 7/1994 | Kizaki et al. | |
| 5,401,127 A | 3/1995 | Nakajima | |
| 5,445,481 A | 8/1995 | Nakajima | |
| 5,545,872 A | * 8/1996 | Nakajima et al. | 219/86.51 |
| 5,734,141 A | 3/1998 | Voilmy et al. | |
| 5,993,125 A | 11/1999 | Shimada | |
| 6,049,053 A | 4/2000 | Shimada | |
| 6,106,372 A | * 8/2000 | Clark | 451/45 |
| 6,188,038 B1 | 2/2001 | Kuzuhiro | |
| 6,195,860 B1 | 3/2001 | Di Rosa | |
| 6,274,840 B1 | * 8/2001 | Kanjo | 219/86.41 |
| RE37,799 E | * 7/2002 | Watanabe et al. | 219/109 |
| 6,444,941 B1 | * 9/2002 | Russo | 219/69.15 |
| 6,448,532 B1 | * 9/2002 | Mittler et al. | 219/117.1 |

* cited by examiner

*Primary Examiner*—Tom Dunn
*Assistant Examiner*—Colleen P. Cooke
(74) *Attorney, Agent, or Firm*—Kathleen T. Petrich

(57) ABSTRACT

A welding electrode tip dressing apparatus for grinding a pair of electrode tips mounted on two opposite shanks and for removing the electrode tips when they are spent. The dressing apparatus includes a tip grinding unit and a tip removal unit. The tip grinding unit is provided with a cutter so as to grind the pair of electrode tips. The tip removal unit is provided with a removal mechanism so as to remove the pair of electrode tips from shanks holding the electrode tips. The tip grinding unit and the tip removal unit are arranged side by side in an apparatus body and connected to a drive transmission mechanism connected to and driven by a single drive device.

20 Claims, 9 Drawing Sheets

WELDING ELECTRODE TIP DRESSING APPARATUS

BACKGROUND OF INVENTION

1. Field of the Invention

The present invention relates to a dressing apparatus, which is capable of removing a pair of electrode tips from a welding gun for replacement as well as grinding a pair of electrode tips mounted on a welding gun for better spot welding.

2. Description of the Prior Art

Hitherto, the grinding of the electrode tips of a welding gun has been carried out in such a way that the electrode tips are ground by bringing the electrode tips into contact with the cutter of a dressing apparatus for a predetermined time period, for example, 15 seconds, and the completion of grinding is verified by determining whether the front end surfaces of the electrode tips are ground to have desired shapes or not.

When the front end surfaces of the electrode tips are not sufficiently ground to have desired shapes, the electrode tips are brought again to the cutter of the dressing apparatus and ground again to have desired shapes. An electrode tip that is consumed to the extent more than a predetermined value should be replaced by a new electrode tip. In the past, the electrode tip is removed from the shank of a welding machine utilizing a tip removal apparatus, such as that shown in Korean Unexamined Patent Application No. 2000-15455.

However, the prior art tip grinding and removal operations are performed by independent apparatuses, so the cutter of a dressing apparatus and the rotary board of a removal apparatus are separately provided. In particular, the operation of automatically replacing an electrode tip is inefficient since the separate apparatuses occupy a relatively wide space, the costs of the apparatuses are high, the moving area for the electrode tip is relatively wide and teaching a welding robot is complicated.

SUMMARY OF INVENTION

Accordingly, the present invention has been made keeping in mind the above problems occurring in the prior art, and an object of the present invention is to provide a compact dressing apparatus which can remove a pair of electrode tips from a welding gun for replacement as well as grind a pair of electrode tips mounted on a welding gun for better spot welding.

Another object of the present invention is to provide a dressing apparatus which allows a welding robot to be easily taught when a welding operation is performed in an automated production line.

In order to accomplish the above objects, the present invention provides a welding electrode tip dressing apparatus for grinding a pair of electrode tips mounted on two opposite shanks and for removing the electrode tips when they are spent. The dressing apparatus comprises a tip grinding unit provided with a cutter so as to grind the pair of electrode tips and a tip removal unit provided with a removal mechanism so as to remove the pair of electrode tips. The tip grinding unit and the tip removal unit are adjacent each other, preferably side-by side, in an apparatus body and are connected to a drive transmission mechanism connected to and driven by a single drive device.

The drive transmission mechanism may include a plurality of speed reduction gears so that the tip grinding unit and the tip removal unit are driven slower than the drive device.

The apparatus body may be held between springs and arranged with the springs to be moved by axial movement of the electrode tips in contact with the tip grinding unit.

The tip grinding unit has a cutter, which may have an outer gear portion that engages a speed reduction gear in the drive transmission mechanism so that the cutter is driven by the drive device. The cutter has an aperture that receives a welding electrode tip and may have two back-to-back grinding surfaces for grinding two opposing electrode tips simultaneously.

The tip removal unit has a rotary board with an aperture for receiving a welding electrode tip and a plurality of claws disposed around the aperture which are made to move to selectively penetrate or release from the welding tip upon normal or reversed rotation of the rotary board about a rotation axis. Each claw is received in a radial slot in the rotary board and moves against an undercut surface or a withdrawal surface of the slot. When the claw moves against the undercut surface, the claw is pushed to an undercut position whereat the claw penetrates the welding tip when the rotary board is rotated in a first direction. When the claw moves against the withdrawal surface, the claw is pushed to a withdrawal position whereat the claw releases from the welding tip when the rotary board is rotated in a second direction.

A holding unit on the tip removal unit holds the claws, has an aperture for receiving a welding electrode tip, and has the same rotation axis as the rotary board. The holding unit rotates relative to the rotary board to move the claws in the slots.

The holding unit is selectively rotationally restrained by a combined rotation restrainer which may include a pair of brake hooks oppositely disposed about a portion of the holding unit. The brake hooks are actuated to selectively close or open to selectively restrain or release the holding unit. The brake hooks provide a restraining force on the holding unit when the brake hooks are closed, and the restraining force is set to allow rotation of the holding unit relative to the combined rotation restrainer after the claws have penetrated the welding electrode tip.

The combined rotation restrainer may include a cylinder with a piston operating therein. The piston has a piston rod constructed to release the rotation restraint of the holding unit during operation of the tip grinding unit.

The above and other objects, features and other advantages of the present invention will be more clearly understood from the following detailed description, claims and drawings.

DETAILED DESCRIPTION

Figure 1:
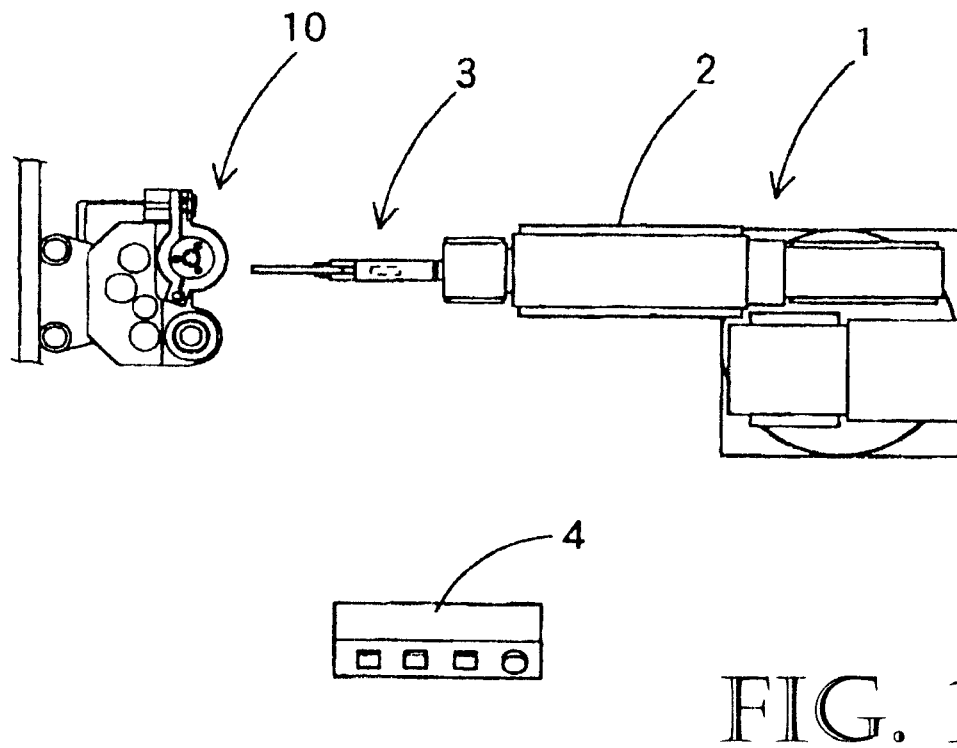
FIG. 1 is a schematic plan view showing a dressing apparatus of the present invention and a welding robot.
Figure 2:
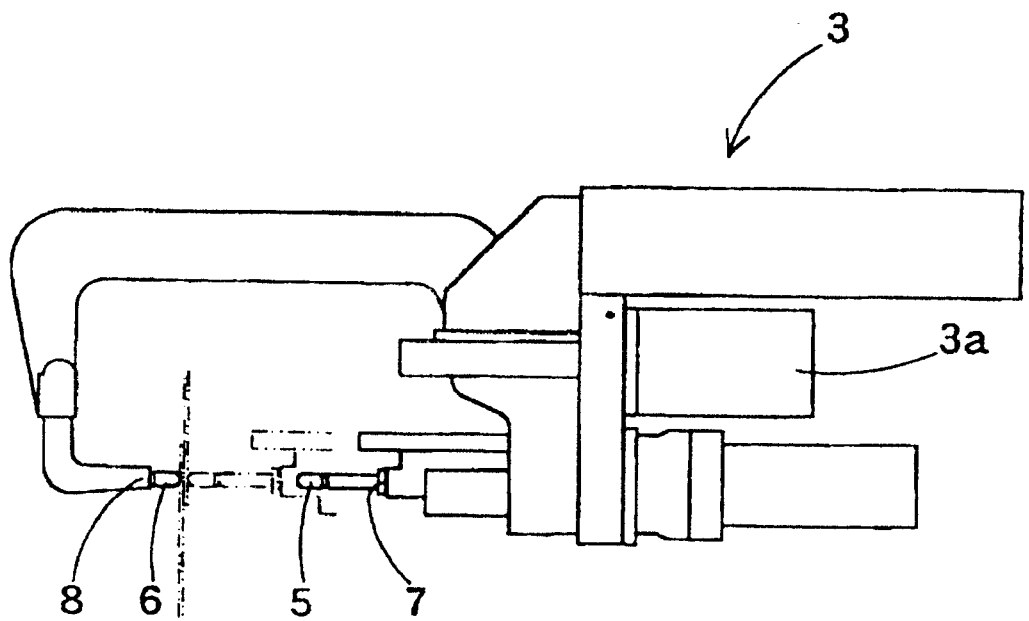
FIG. 2 is a schematic side view showing the servo gun of the welding robot.

As illustrated in FIGS. 1 and 2, a welding electrode tip dressing apparatus 10 of the present invention is constructed so that its operations of both grinding a pair of electrode tips 5 and 6 mounted on a multi-joint welding robot 1 and removing the electrode tips 5 and 6 are controlled by a control unit 4.

The electrode tips 5 and 6 are mounted on a servo gun 3 held by the front end of the arm 2 of the welding robot 1 while being inserted into the two opposite shanks 7 and 8 of the servo gun 3, respectively.

Figure 3:
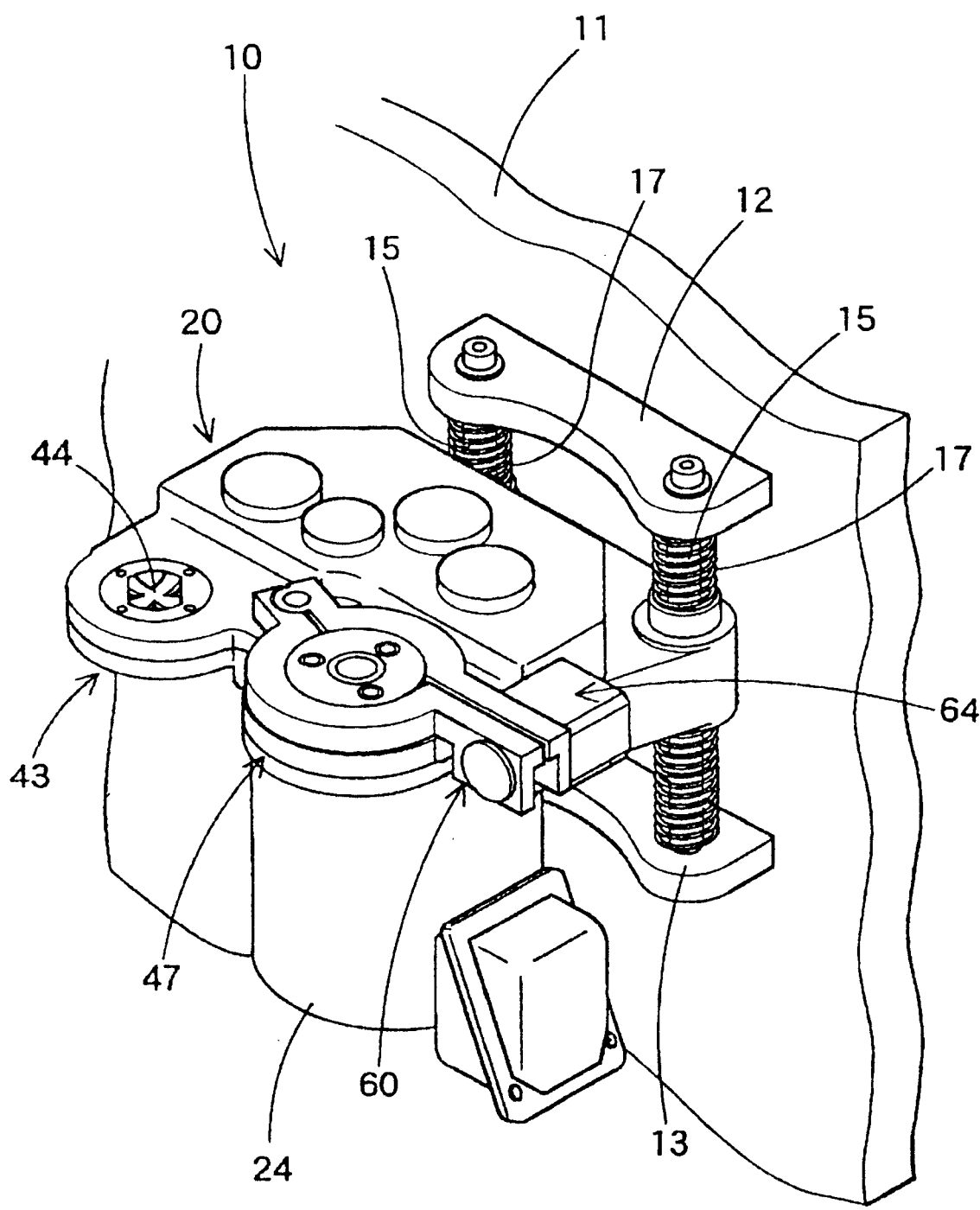
FIG. 3 is a perspective view showing the dressing apparatus of the present invention.

The welding electrode tip dressing apparatus 10, as depicted in FIG. 3, has a tip grinding unit 43 and a tip removal unit 47 arranged adjacent each other, preferably side by side, in a single apparatus body 20. The tip grinding unit 43 and a tip removal unit 47 are connected to a drive transmission mechanism connected to a single drive device.

The welding electrode tip dressing apparatus 10 includes a support frame 11, a dressing apparatus body 20, upper and lower brackets 12 and 13 for holding the dressing apparatus body 20 so as to allow the support frame 11 to support the dressing apparatus body 20, two guide rods 15 for each connecting the upper and lower brackets 12 and 13 while being extended through the dressing apparatus body 20, and compression springs 17 for vertically compressing the dressing apparatus body 20.

Figure 4:
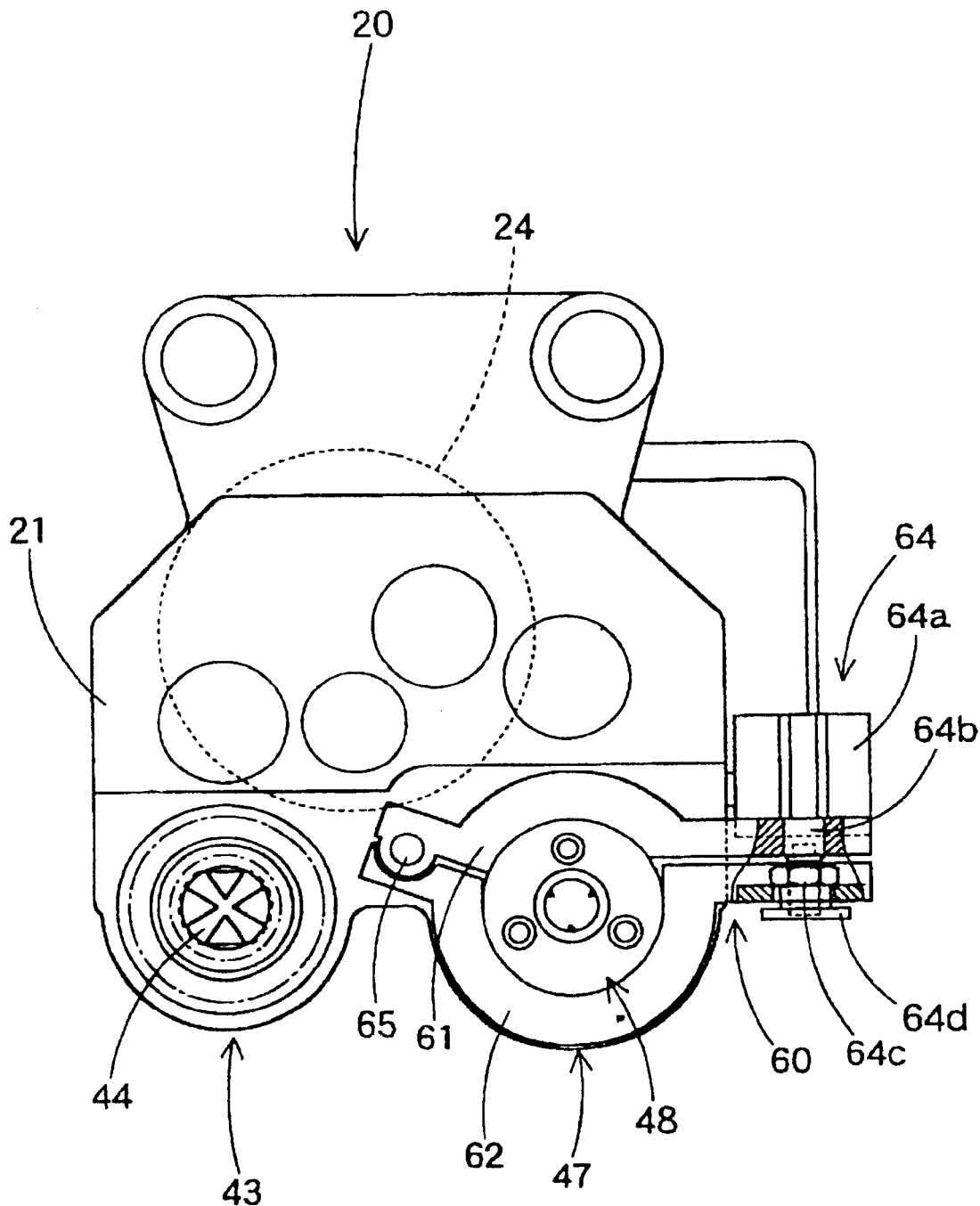
FIG. 4 is a plan view showing the dressing apparatus body.
Figure 5:
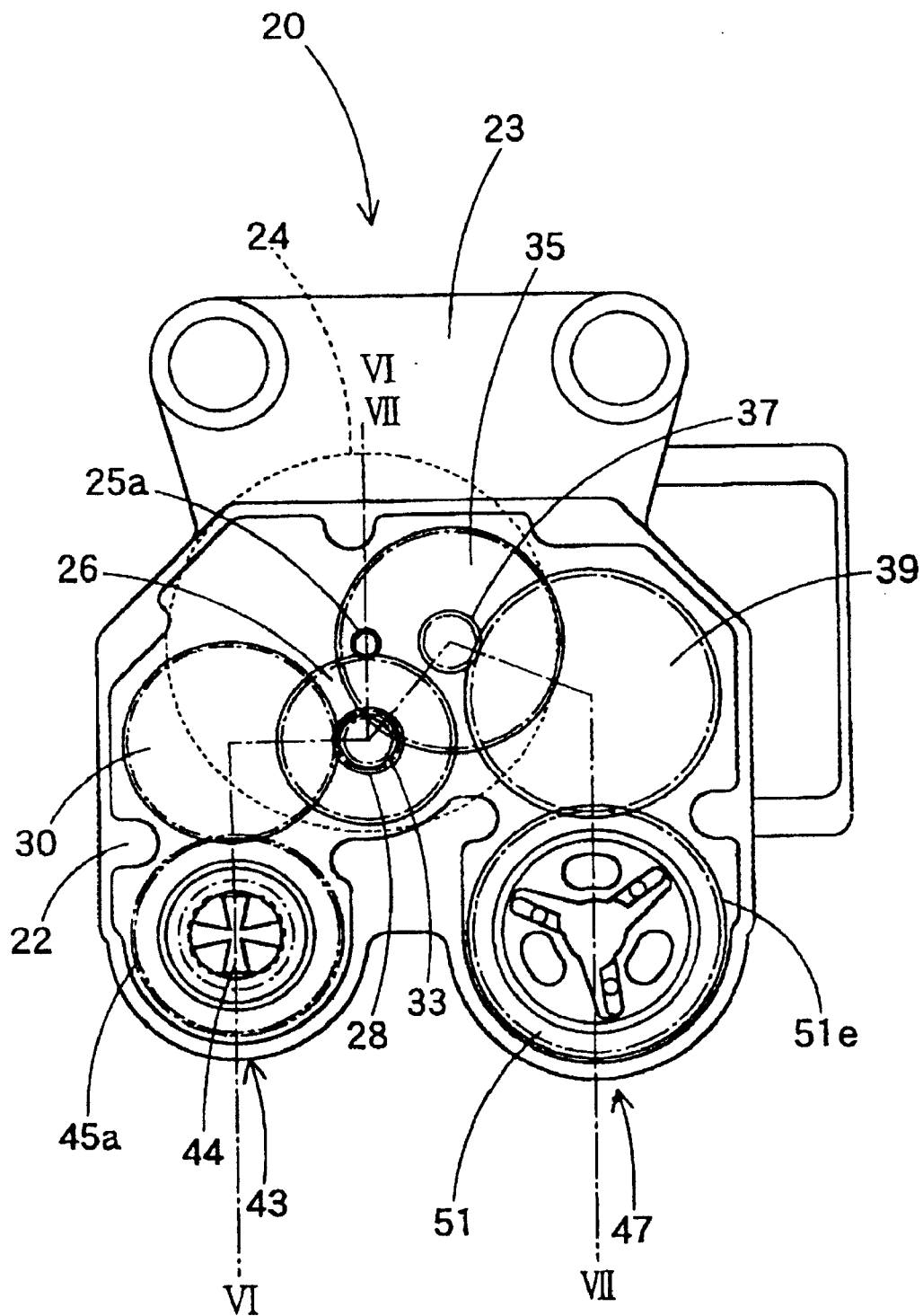
FIG. 5 is a sectional view showing the power transmission mechanism of the dressing apparatus of the present invention.

The dressing apparatus body 20, as shown in FIGS. 4 and 5, is comprised of upper and lower cases 21 and 22, a tip grinding nit 43 and a tip removal unit 47 forward situated between the upper and lower cases 21 and 22, a servo motor 24 constructed to drive the cutter 44 of the tip grinding unit 43 and the rotary board 51 of the tip removal unit 47 through a drive transmission mechanism, and a guide block 23 fitted around the guide rods 15 to be supported by the support frame 11.

Figure 6:
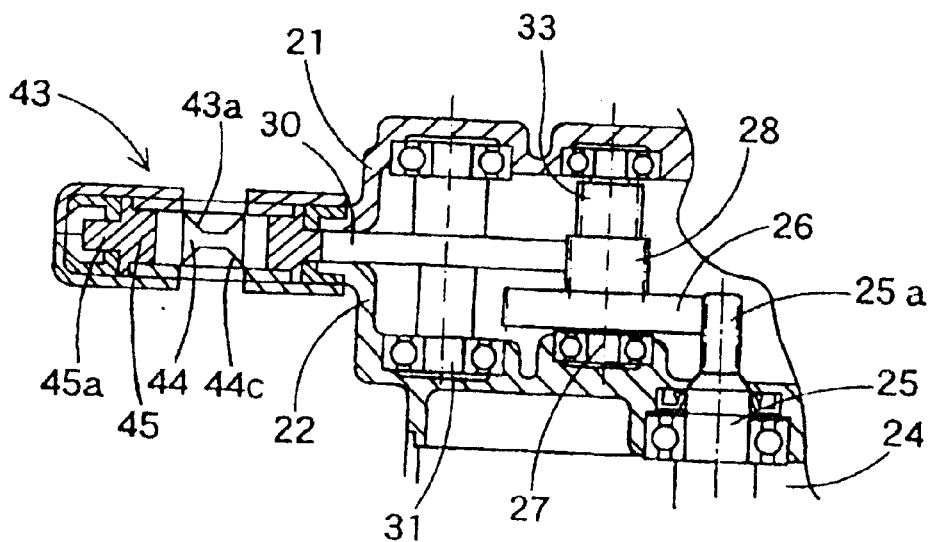
FIG. 6 is a sectional view taken along line VI—VI of FIG. 5.
Figure 7:
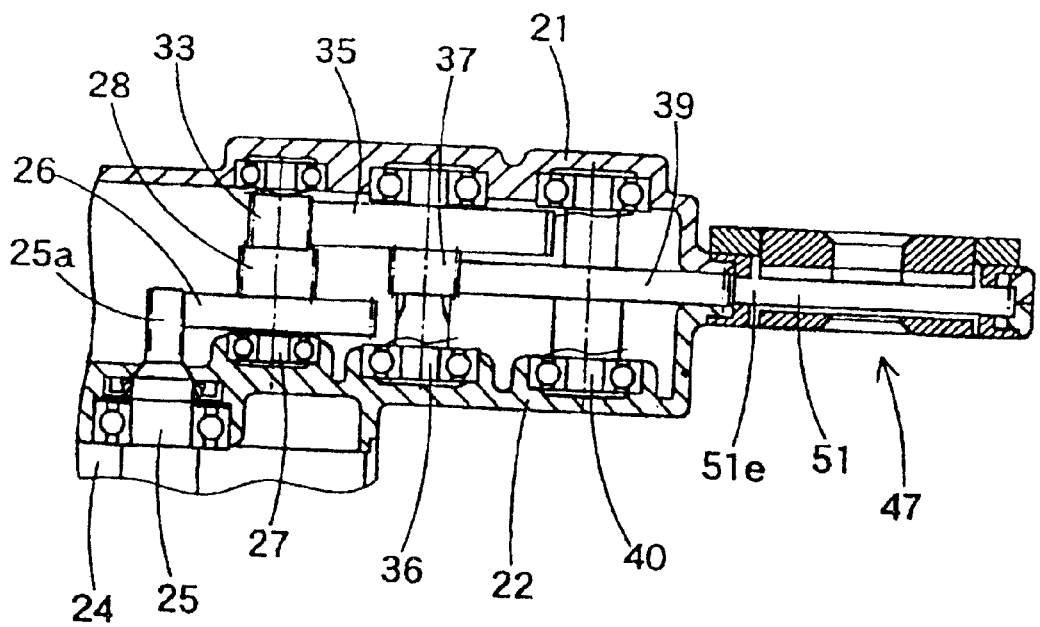
FIG. 7 is a sectional view taken along line VII—VII of FIG. 5.

The drive transmission mechanism for transmitting driving force from the servomotor 24 to the tip grinding and removal units 43 and 47, as illustrated in FIGS. 5 to 7, is comprised of a plurality of gears situated between the upper and lower cases 21 and 22.

A drive gear 25a is fitted around the drive shaft 25 of the servomotor 24, and is engaged with a driven gear 26. The driven gear 26 is fitted around a main shaft 27 that is supported by the upper and lower cases 21 and 22, and has a diameter larger than that of the drive gear 25a to reduce the rotation speed of the servomotor 24. The first gear 28 of a first driving lineage and the first gear 33 of a second driving lineage are fitted around the main shaft 27 to branch into the first driving lineage for transmitting driving force to the tip grinding unit 43 and the second driving lineage for transmitting driving force to the tip removal unit 47.

An intermediate gear 30 is fitted around a support shaft 31 supported by the upper and lower cases 21 and 22 to be engaged with the first gear 28 of the first driving lineage and to transmit rotation movement to the tip grinding unit 43, and has a diameter larger than that of the first gear 28. The intermediate gear 30 is engaged with the gear 45a of the tip grinding unit 43, and drives the cutter 44 of the tip grinding unit 43.

The first gear 33 of the second driving lineage is engaged with a speed reduction gear 35 to further reduce the rotational speed of the gear 26. The speed reduction gear 35 is fitted around a support shaft 36 rotatably supported by the upper and lower cases 21 and 22, and allows the support shaft 36 to be rotated. The second gear 37 is engaged with an intermediate gear 39 having a diameter larger than that of the second gear 37 so as to reduce the rotational speed of the second gear 37 fitted around the support shaft 36 under the speed reduction gear 35. The intermediate gear 39 is fitted around a support shaft 40 rotatably supported by the upper and lower cases 21 and 22, and engaged with a gear 51e that rotates the rotary board 51 of the tip removal unit 47.

Referring to FIG. 6, the tip grinding unit 43 is provided with the cutter 44 to grind the pair of electrode tips 5 and 6. The cutter 44 is held by a ring-shaped holder 45 to be rotated around a vertical shaft, and provided with two back-to-back grinding surfaces 44a and 44c to grind the electrode tips 5 and 6.

The holder 45 allows the outer portion of the cutter 44 to be projected and to be rotatably held between the upper and lower cases 21 and 22. A gear portion 45a is formed on the peripheral surface of the holder 45 to be engaged with the intermediate gear 30.

Figure 8:
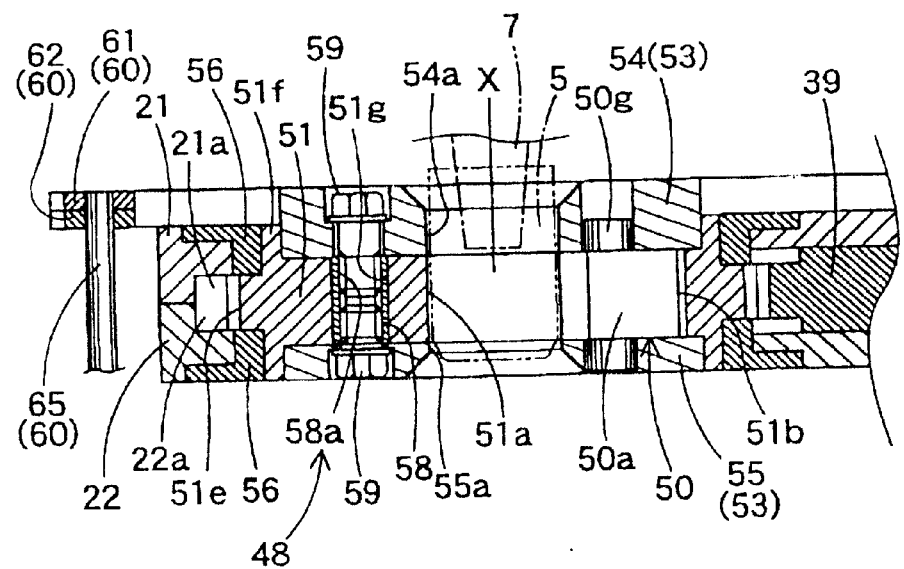
FIG. 8 is a sectional view showing the tip removal unit of the dressing apparatus of the present invention.
Figure 9:
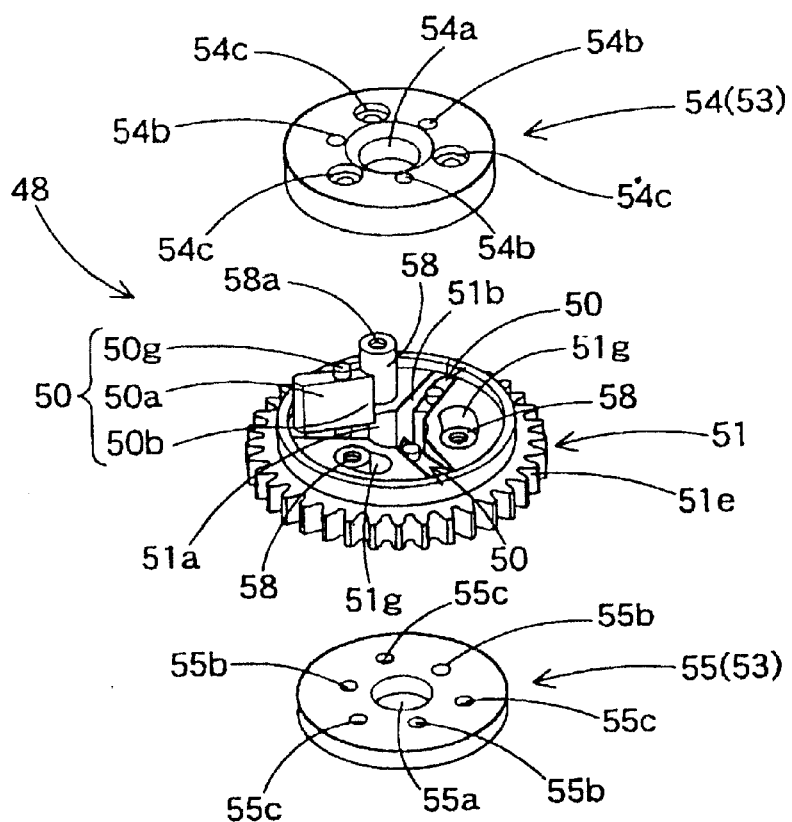
FIG. 9 is an exploded perspective view showing the tip removal unit of the dressing apparatus of the present invention.

The tip removal unit 47, as illustrated in FIGS. 4, 8 and 9, includes a tip removal mechanism 48. The tip removal unit 47 serves to remove consumed electrode tips 5 and 6 from the shanks 7 and 8 of the servo gun 3 and to deposit them in a collecting box (not shown).

The tip removal mechanism 48 functions to remove the electrode tips 5 and 6 from the shanks 7 and 8 using three claws 50 on the basis of the fact that the electrode tips 5 and 6 are easily removed from the shanks 7 and 8 by rotation. As shown in FIGS. 8 and 9, the tip removal mechanism 58 of an embodiment of the present invention is comprised of the three claws 50, the rotary board 51, a holding unit 53, two pushing rings 56, and a combined rotation restrainer 60, which are supported by the upper and lower cases 21 and 22.

The rotary board 51 rotates the claws 50 between an undercut region (shown in FIGS. 14 and 15) where the claws 50 penetrate into an electrode tip 5 and a withdrawal region (shown in FIG. 12) where the claws 50 do not interfere with the electrode tip 5. The rotary board 51 is a ring shape that has at its center a vertically formed aperture 51a which receives the electrode tip 5.

The central rotation axis X of the rotary board 51 extends vertically through the center of the aperture 1a. A plurality of radial slots 51b are formed around the aperture 1a to accommodate the claws 50. An undercut surface 51c (see FIG. 13) is formed on the right side of each radial slot 51b so as to push the claws 50 to the undercut region, while a withdrawal surface 51d (see FIG. 15) is formed on the left side of each radial slot 51b so as to push the claws 50 to the withdrawal region.

A gear portion 51e is formed on the circumferential portion of the rotary board 51 to be engaged with the intermediate gear 39. Three arcuate longitudinal holes 51g are vertically formed in the rotary board 51 with each longitudinal hole 51g formed between two neighboring radial slots 51b. Each of the longitudinal holes 51g accommodates a spacer 58, and is arc-shaped to guide the movement of the spacer 58. Two rims 51f are formed on the rotary board 51, with each rim 51f vertically projected between the circumferential gear portion 51e and the central remaining portion.

The rotary board 51 is accommodated in the circular depressions 21a and 22a of the upper and lower cases 21 and 22 while being engaged with the intermediate gear 39, and is rotatably held by the upper and lower cases 21 and 22 with the upper and lower surfaces of the gear portion 51e pushed by the ring-shaped pushing rings 56.

Each of the claws 50 is comprised of a rectangular plate-shaped body 50a and two support projections 50g respectively projected from the center portions of the upper and lower surfaces of the body 50a. The claw body 50a has an acute-angled inner end so as to allow the claw 50 to easily penetrate into the outer surface of each of the electrode tips 5 and 6.

The holding unit 53 allows the claws 50 disposed in the radial slots 51b to be rotatably held while rotatably holding the support projections 50g of the claws 50. The holding unit 53 is constructed by connecting upper and lower disks 54 and 55 to three spacers 58 each having a bolt hole 58a by six bolts 59.

The upper and lower disks 54 and 55 have center holes 54a and 55a, respectively, that allow the electrode tip 5 to pass through. The upper and lower disks 54 and 55 are held by the rims 51f of the rotary board 51 to be rotatable around the central rotation axis X. The upper portion of the upper disk 54 is projected to be higher than the rim 51f of the rotary board 51 so as to be forcibly pushed by the pair of brake hooks 61 and 62.

Three support holes 54b or 55b and three connection holes 54c or 55c are alternately formed around the center hole 54a and 55a. Each of the support holes 54b and 55b accommodates each of the support projections 50g of the claws 50 so as to rotatably support each of the claws 50. Each of the connection holes 54c and 55c is constructed to be stepped. Two bolts 59 are upwardly and downwardly tightened into the bolt hole 58a of each spacer 58 inserted into the longitudinal hole 51g of the rotary board 51, with the heads of the bolts 59 brought into contact with the horizontal surfaces of the stepped connection holes 54c and 55c.

Each of the spacers 58 is formed to be longer than each of the longitudinal holes 51g and the upper and lower surfaces of the spacers 58 are brought into contact with peripheral portions around the connection holes 54c and 55c, so that the holding unit 53 fabricated by connecting the disks 54 and 55 and the spacers 58 by the bolts 59 rotates relative to the rotary board 51 about the central rotation axis X.

The combined rotation restrainer 60 is constructed to restrain the combined rotation of the rotary board 51 and the claws 50 by restraining the rotation of the upper disk 54. As shown in FIGS. 3 and 4, the combined rotation restrainer 60 is comprised of a pair of brake hooks 61 and 62 forcibly brought into contact with the circumferential surface of the upper disk 54 and an air cylinder 64 for forcibly bringing the brake hooks 61 and 62 into contact with the upper disk 54 and releasing the upper disk 54 from the brake hooks 61 and 62. The combined rotation restrainer 60 is controlled in such a way that the upper disk 54 is released from the brake hooks 61 and 62 during the operation of the tip grinding unit 43 and is forcibly brought into contact with the brake hooks 61 and 62 during the operation of the tip removal unit 47.

The brake hooks 61 and 62 are formed to be clamp-shaped so as to push the circumferential surface of the upper disk 54. The brake hooks 61 and 62 are supported by a pin 65 supported on the upper case 21. The free end of one brake hook 61 is fixedly attached to the case 64a of the air cylinder 64, while the free end of the other brake hook 61 is fixedly attached to the piston rod 64b of the air cylinder 64 by a pushing pin 64c and a nut 64d. Accordingly, when the piston rod 64b is extended, one brake hook 62 is rotated around the pin 65, thereby separating one brake hook 62 from the other brake hook 61 and, accordingly, releasing the upper disk 54 from the combined rotation restrainer 60.

In this case, although the rotary board 51 is rotated through the drive mechanism of the second drive lineage by the servomotor 24, the pin 65 prevents the combined rotation restrainer 60 from being rotated with the rotary board 51.

The rotation restraining force of the brake hooks 61 and 62 acting on the upper disk 54 is set to allow the holding unit 53 to be rotated together with the rotary board 51 by forcing the support projections 50g of the claws 50 when the claws 50 penetrate into the electrode tip 5 or 6 and undercut resistance is somewhat increased by the counterclockwise rotation of the rotary board 51.

The welding electrode tip dressing apparatus 10 constructed as described above is used in an automated welding line in which the dressing apparatus 10 is controlled and operated, together with the welding robot 1 and the servo gun 3.

The servo gun 3 is widely utilized. The servo gun 3 holds the electrode tips 5 to be moved by the servomotor 3a in which an encoder is contained, and has a position control function to allow the electrode tips 5 and 6 to equally approach each other. The servo gun 3 has an operation function, and is capable of carrying out the position control and pushing force control of the electrode tip 5 by controlling the number of rotations and torque of the servomotor 3a.

In the use of the servo gun 3, the absolute positions of the electrode tips 5 and 6 mounted on the servo gun 3 are detected and used as a reference position for teaching a welding robot. The reference position is determined by bringing the electrode tips 5 and 6 into contact with each other. The tip grinding and removal operations of the dressing apparatus 10 at its installation position are controlled utilizing the reference position.

After the reference position is detected, and the welding, tip grinding and tip removal operations are taught to the control unit 4, the welding robot 1 carries out the welding operation.

The electrode tips 5 and 6 consumed in the welding operation are ground by the tip grinding unit 43 of the dressing apparatus 10. The tip grinding operation can be directly finished, or finally finished after being firstly finished.

Figure 10:
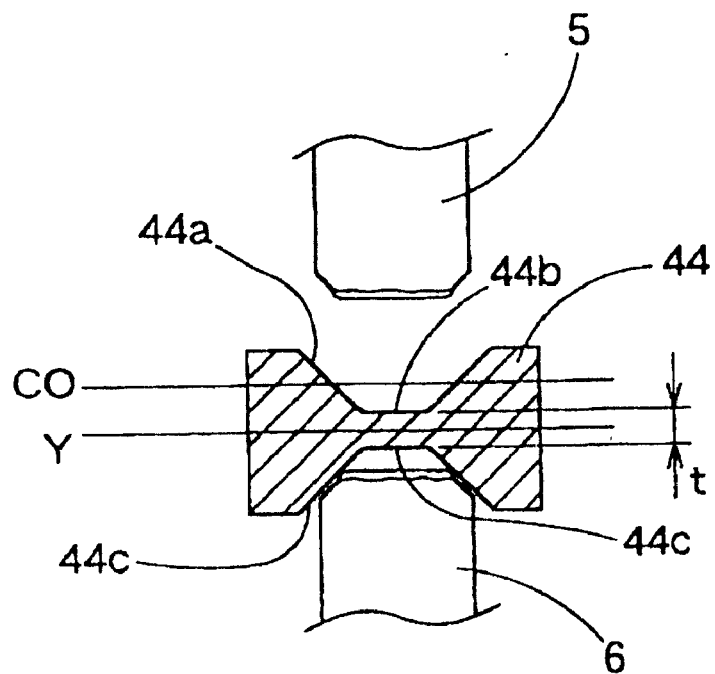
FIG. 10 is a view showing the state in which electrode tips are moved for a grinding operation.
Figure 11:
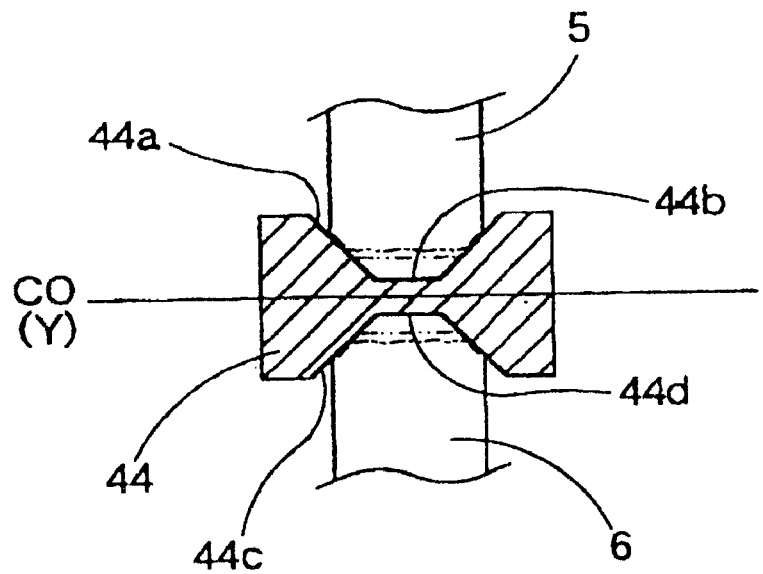
FIG. 11 is a view showing the state in which electrode tips have been ground in the tip grinding unit.

As shown FIGS. 10 and 11, after the grinding reference position is set at the central position "CO" of grinding and the servo gun 3 is positioned to allow the electrode tips 5 and 6 to be ground by the cutter 44 of the dressing apparatus 10, the cutter 44 is rotated under the position control of the servo gun 3.

The rotation of the cutter 44 is performed by operating the servomotor 24 and, thereby, rotating the gear 45a of the holder 45 through the drive gear 25a, the gear 26, the first gear 28 and the intermediate gear 30. In this case, the rotary board 51 of the tip removal unit 47 is rotated, while the pair of brake hooks 61 and 62 are separated from the circumferential surface of the upper disk 54 to release the upper disk 54 from the combined rotation restrainer 60. As a result, claws 50 held by the disk 54 are not moved relative to the rotary board 51, the rotation of the cutter 44 is not disturbed, and early wear between the disk 54 and the brake hooks 61 and 62 is prevented. Additionally, since the brake hooks 61 and 62 are supported by the pin 65 supported on the upper case 21, they are not rotated with the rotary board 51.

The pair of electrode tips 5 and 6 are ground by equally moving the electrode tips 5 and 6 to the central position "CO" of grinding and further moving them to be spaced apart from each other by the thickness "t" of the cutter 44. The thickness "t" of the cutter 44 is the distance between the center horizontal portions 44b and 44d of the grinding surfaces 44a and 44c of the cutter 44.

In the grinding operation, although the set central reference position "CO" is not set at the central position "Y" of the thickness of the cutter 44, the dressing apparatus body 20 is held and arranged to be moved according to the axial movement of the electrode tips 5 and 6 by the coil springs 17. For this reason, as the electrode tips 5 and 6 approach each other, the dressing apparatus body 20 is moved. Additionally, after the completion of grinding, the central position "Y" of the thickness of the cutter 44 is set at the central reference position CO that is a grinding reference position.

When the consumed electrode tips 5 and 6 equally approach each other toward the central reference position "CO" and are spaced apart from each other by the thickness "t" of the cutter 44, the dressing apparatus body 20 equipped with the cutter 44 can move and the electrode tips 5 and 6 accurately reach the center horizontal portions 44b and 44d of the grinding surfaces 44a and 44c of the cutter 44 as shown in FIG. 11, regardless of difference in amount of consumption.

In one embodiment, the number of rotations of the cutter 44 is simply controlled by the servomotor 24 of the dressing apparatus 10. The grinding operation can be performed rapidly and clearly. Additionally, it becomes possible to control the servomotor 3a of the servo gun 3 and the servomotor 24 of the dressing apparatus 10 by the control unit 4 of the welding robot 1. Consequently, such control can be included in the program of the control unit 4 of the welding robot 1 so as to smoothly grind the electrode tips 5 and 6.

In such grinding operation, the electrode tips 6 and 7 are ground in proportion to the amount of consumption, so the electrode tips 5 and 6 are effectively ground without waste.

The control unit 4 calculates variations between the reference position and the detected ground position of the pair of the electrode tips 5 and 6 and selects a welding reference position at which the electrode tips 5 and 6 in the vicinity of the reference position are brought into contact with each other.

On the basis of the welding reference position, the arrangement position and pushing force of the electrode tips 5 and 6 are controlled at the position of the welding operation. Additionally, in the grinding operation after the welding operation, the tip grinding and tip removal operations are controlled at the installation position of the dressing apparatus on the basis of the original reference position.

Additionally, in another embodiment, when the amount of consumption of each of the electrode tips 5 and 6 is greater than a predetermined value, the replacement of the electrode tip 5 or 6 is performed. Accordingly, the consumed electrode tip 5 or 6 is replaced by a new electrode tip utilizing the tip removal unit 47 of the dressing apparatus 10.

Figure 12:
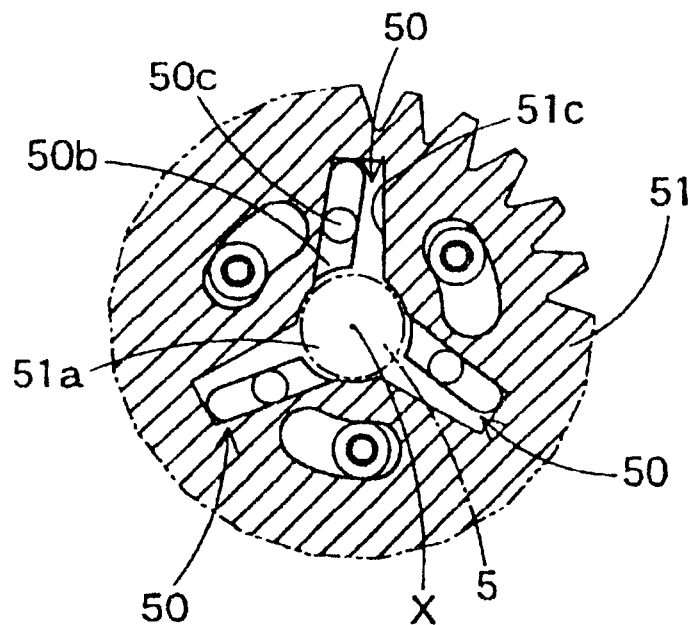
FIG. 12 is a sectional view showing the initial state of the tip removal unit.
Figure 13:
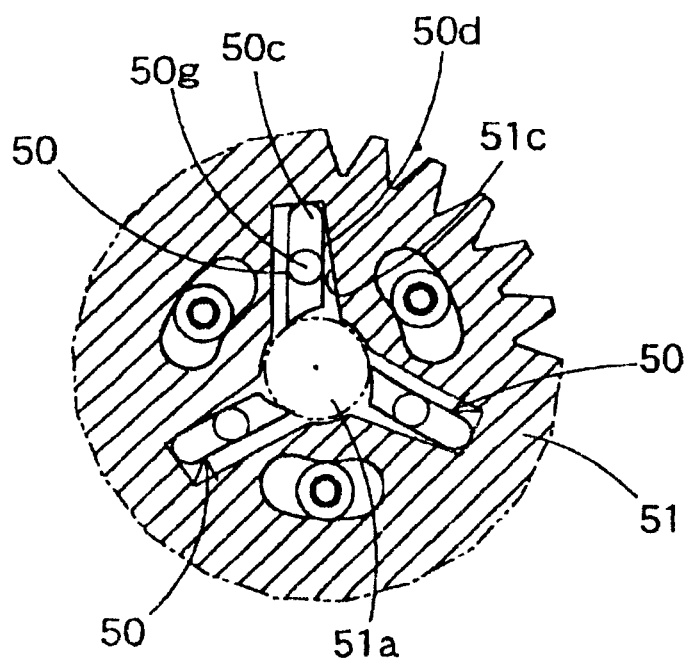
FIG. 13 is a sectional view showing the state in which a rotary board is rotated.
Figure 14:
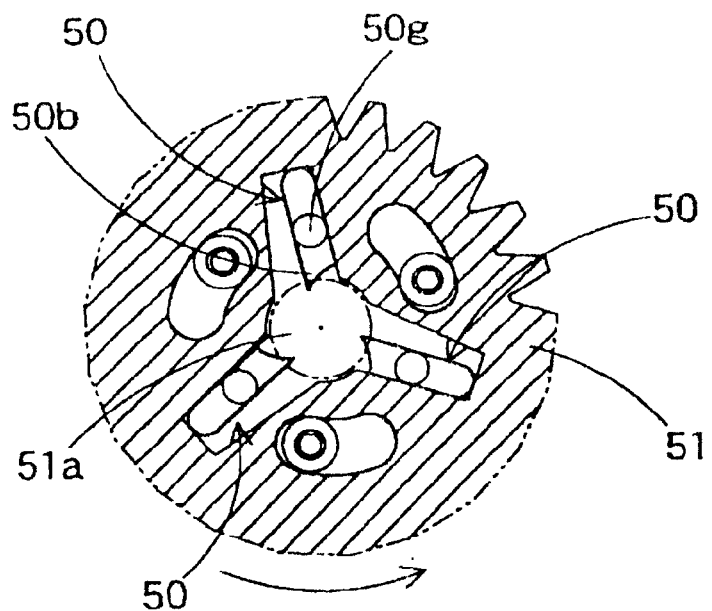
FIG. 14 is a sectional view showing the state just before a holding unit is rotated.

The control unit 4 controls the operation of the welding robot 1, the servo gun 3 and the servomotors 3a and 24 of the dressing apparatus 10. The electrode tip 5 is inserted into the hole 54a of the upper disk 54, the hole 55a of the lower disk 55 and the aperture 51a of the rotary board 51. Thereafter, as shown in FIGS. 12, 13 and 14, the control unit 4 rotates the rotary board 51 around the central rotation axis X in a counterclockwise direction 4 at a predetermined angle (in an embodiment, about 20 degrees) by the operation of the servomotor 24 through the drive gear 25a and the gears of the second drive lineage. At the same time, the air cylinder 64 moves the brake hooks 62 toward the upper disk 54 by retracting its extended piston rod 64b, and, thereby, allows the brake hooks 62 to push the upper disk 54 with a predetermined amount of torque. This operation is controlled by the control unit 4.

As illustrated in FIGS. 12 and 13, each of the undercut surfaces 51c of the rotary board 51 is brought into contact with the convex and side surfaces 50c and 50d of each claw 50, and, accordingly, rotates each claw 50 around its support projection in a counterclockwise direction, thereby rotating the claw 50 to an undercut region. The interior ends 50b of the claws 50 undercut the circumferential surfaces of the electrode tips 5 to hold the electrode tips 5 in the aperture 51a.

At this time, when the rotary board 51 is rotated in a counterclockwise direction, the interior ends 50b of the claws 50 are oriented toward the central axis of the electrode tip 5. Accordingly, the claws 50 penetrate deeply into the electrode tip 5 and the undercut resistance of the claws 50 is increased. In that case, the claws 50 become difficult to rotate, so the rotational torque of the rotary board 51 is exerted on the inner surfaces of the support holes 54b and 55b of the disks 54 and 55 of the holding unit 53 through the support projections 50g of the claws 50 and the holding unit 53 is rotated in a counterclockwise direction together with the rotary board 51 while overcoming the restraining force of the brake hooks 61 and 62.

At this time, the holding unit 53 is rotated while holding the electrode tip 5 in the aperture 51a by allowing the claws 50 to undercut the electrode tip 5, the electrode tip 5 is rotated together with the rotary board 51 in a counterclockwise direction. When the electrode tip 5 is rotated even slightly, the electrode tip 5 is disengaged from the tapered shank 7.

Figure 15:
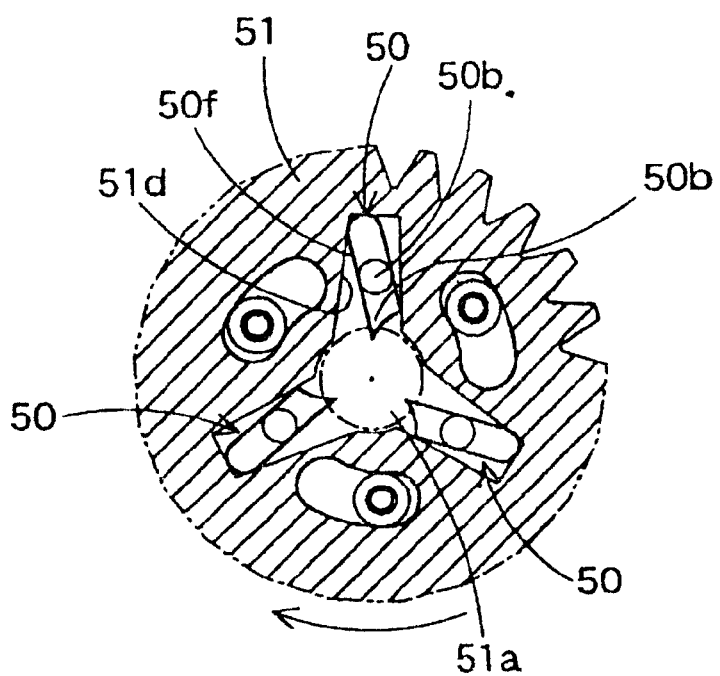
FIG. 15 is a sectional view showing the state in which the rotary board is reversed.

As a result, when the shank 7 is moved upwardly after being rotated at a predetermined angle, for example, about 20 degrees, the electrode tip 5 can be removed from the shank 7. Thereafter, after the servo gun 3 is moved aside, the rotary board 51 is rotated around the central rotation axis X in a clockwise direction at about 20 degrees and, thus, returned to its initial state, by the reverse operation of the servomotor 24. As shown in FIG. 15, the withdrawal surfaces 51d of the rotary board 51 are brought into contact with the convex and side surfaces 50c and 50d of the claws 50 and rotate the claws 50 around the support projections 50g in a clockwise direction, so the interior ends 50b of the claws 50 are situated in a withdrawal region where the electrode tip 5 is released from the aperture 51a.

In this case, the electrode tip 5 is released from the undercutting of the interior ends 50b of the claws 50, falls through the aperture 51a of the rotary board 51, and is deposited in a collection box (not shown). The reverse rotation of the rotary board 51 is performed in the direction of reducing the undercut resistance of the claws 50 and the braking force of the brake hooks 61 and 62 is exerted on the holding unit 53, so the holding unit 53 is not rotated and only the claws 50 are rotated to the withdraw region during the reverse rotation of the rotary board 51.

The lower electrode tip 6 held by the shank 8 is removed and deposited in the collecting box in such a way that the lower electrode tip 6 is inserted into the center hole 54a of the upper disk 54, the center hole 55a of the lower disk 55 and the aperture 51a of the rotary board 51, the rotary board 51 is rotated in a counterclockwise direction, the servo gun 3 is moved to downwardly and laterally move the shank 8 and the rotary board 51 is reverse d in a clockwise direction, in the same manner as that for the upper electrode tip 5.

The present invention provides a welding electrode tip dressing apparatus 10 which combines a tip removal unit 47 and a tip grinding unit 43 in a single apparatus operated by a single drive device, such as a servo motor 24.

Though the drive device drives both the tip removal unit 47 and the tip grinding unit 43, a welding tip is only present in one of the units at a time. Therefore, during the grinding operation, the operation of the tip removal unit 47 does not affect the tip grinding operation of the tip grinding unit 43. Also, the tip removal unit 48 is released from the combined rotation restrainer 60 during the grinding operation, so there is no hindrance of the operation of the tip grinding unit 43 by the combined rotation restrainer 60, and wear is minimized between the tip removal unit 48 and the combined rotation restrainer 60. With the holding unit 53 of the tip removal unit 47 rotationally released form the combined rotation restrainer 60, the holding unit 53 rotates with the rotary board 51and the claws 50 are not moved to the undercut region.

Likewise, during the tip removal operation , though the cutter of the tip grinding unit 43 is rotated, since there is no tip present in the tip grinding unit the operation of the tip grinding unit 43 does not affect the operation of the tip removal unit 47. To remove a tip, the combined rotation restrainer 60 rotationally restrains the holding unit 53, thereby forcing the rotary board 51 to rotate relative to the holding unit 53 to move the interior ends 51b of the claws 50 to the undercut region where the interior ends 50b of the claws 50 penetrate into the electrode tip. Further rotation of the rotary board 51 rotates the holding unit 53 and the tip held by the claws 50 to disengage the tip from the shank because the restraining force of the combined rotation restrainer 60 exerted on the holding unit 53 is set to allow such rotation. After the tip is released from the shank, the rotary board 51 is rotated in the reverse direction to release the tip from the claws 50, allowing the tip to drop into a bucket.

As described above, in the welding electrode tip dressing apparatus, the tip grinding unit 43 and the tip removal unit 47 are provided in a single apparatus and driven by a single drive device, such as servomotor 24. As a result, the welding electrode tip dressing apparatus, having various functions, can be constructed to be simple so the number of the parts of the welding apparatus can be reduced and wide space can be obtained around the welding robot 1. Accordingly, the dressing apparatus can be fabricated at low costs.

In addition, when the dressing apparatus of the present invention is disposed in an automated production line, the positions of the tip grinding unit 43 and the tip removal unit 47 are fixed, thus allowing a welding robot to be easily taught. Additionally, the movement of the electrode tip can be restricted to a small range, so the efficiency of operation can be improved.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A welding electrode tip dressing apparatus, for grinding a pair of electrode tips mounted on two opposite shanks, comprising:
   a tip grinding unit provided with a cutter so as to grind the pair of electrode tips;
   a tip removal unit provided with a removal mechanism so as to remove the pair of electrode tips; and
   wherein the tip grinding unit and the tip removal unit are adjacent each other in an apparatus body and are connected to a drive transmission mechanism connected to and driven by a single drive device.

2. The apparatus of claim 1, wherein the tip grinding unit and the tip removal unit are arranged side-by side in the apparatus body.

3. The apparatus of claim 1, wherein the apparatus body is held between springs and arranged with the springs to be moved by axial movement of the electrode tips in contact with the tip grinding unit.

4. The apparatus of claim 1, wherein the drive transmission mechanism includes a plurality of speed reduction gears so that the tip grinding unit and the tip removal unit are driven slower than the drive device.

5. The apparatus of claim 4, wherein the apparatus body has an upper portion and a lower portion, the tip grinding unit has a cutter, the tip removal unit has a rotary board, and the cutter and the rotary board are both rotatably held between the upper and lower portions of the apparatus body.

6. The apparatus of claim 5, wherein the cutter has an outer gear portion that engages a speed reduction gear in the drive transmission mechanism so that the cutter is driven by the drive device.

7. The apparatus of claim 1, wherein the tip grinding unit has a cutter with an aperture that receives a welding electrode tip, the cutter having two back-to-back grinding surfaces for grinding two opposing electrode tips simultaneously.

8. The apparatus of claim 5, wherein the rotary board includes an aperture for receiving a welding electrode tip and a plurality of claws disposed around the aperture which are made to move to selectively penetrate or release from the welding tip upon normal or reversed rotation of the rotary board about a rotation axis.

9. The apparatus of claim 8, wherein the rotary board has a plurality of radial slots, each slot receiving a claw.

10. The apparatus of claim 9, wherein each slot has an undercut surface against which the claw engages to push the claw to an undercut position, whereat the claw penetrates the welding tip, when the rotary board is rotated in a first direction.

11. The apparatus of claim 10, wherein each slot has a withdrawal surface against which the claw engages to push the claw to a withdrawal position, whereat the claw releases from the welding tip, when the rotary board is rotated in a second direction.

12. The apparatus of claim 8, wherein the tip removal unit includes a holding unit which holds the claws; the holding unit having an aperture for receiving a welding electrode tip, and having a same rotation axis as that of the rotary board; the holding unit being rotated relative to the rotary board to move the claws.

13. The apparatus of claim 12, wherein the tip removal unit includes a combined rotation restrainer for restraining the combined rotation of the claws and the rotary board by restraining rotation of the holding unit.

14. The apparatus of claim 13, wherein the combined rotation restrainer includes a pair of brake hooks oppositely disposed about a portion of the holding unit, the brake hooks being actuated to selectively close or open to selectively restrain or release the holding unit.

15. The apparatus of claim 14, wherein the brake hooks are actuated by a piston operating in a cylinder.

16. The apparatus of claim 14, wherein the brake hooks provide a restraining force on the holding unit when the brake hooks are closed, and the restraining force is set to allow rotation of the holding unit relative to the combined rotation restrainer after the claws have penetrated the welding electrode tip.

17. The apparatus of claim 1, wherein the tip removal unit comprises:
    a rotary board rotatably connected to the drive transmission mechanism and provided with an aperture for receiving one of the electrode tips;
    a plurality of claws with interior ends moved between an undercut region, where the interior ends of the claws penetrate into the electrode tip, and a withdrawal region where the claws do not interfere with the electrode tip, by normal and reverse rotation of the rotary board;
    a holding unit for holding the claws, the holding unit having an aperture for receiving the electrode tip and having a same rotation axis as that of the rotary board; and
    a combined rotation restrainer for restraining combined rotation of the claws and the rotary board by restraining the holding unit;
    the combined rotation restrainer being constructed to selectively rotationally restrain the holding unit, thereby forcing the rotary board to rotate relative to the holding unit to move the interior ends of the claws to the undercut region where the interior ends of the claws penetrate into the electrode tip, or to rotationally release the holding unit, thereby allowing the rotary board to rotate with the holding unit.

18. The apparatus of claim 17, wherein the combined rotation restrainer includes a cylinder with a piston operating therein, the piston having a piston rod constructed to release the rotation restraint of the holding unit during operation of the tip grinding unit.

19. A welding electrode tip dressing apparatus, for grinding a pair of electrode tips mounted on two opposite shanks and removing the electrode tips when they are spent, comprising:
    a tip grinding unit provided with a cutter having an aperture that receives a welding electrode tip, the cutter having two back-to-back grinding surfaces for grinding two opposing electrode tips simultaneously;
    a tip removal unit provided with a rotary board having an aperture for receiving a welding electrode tip and a plurality of claws disposed around the aperture which are made to move to selectively penetrate or release from the welding tip upon normal or reversed rotation of the rotary board about a rotation axis; and wherein the tip grinding unit and the tip removal unit are arranged side-by-side in an apparatus body and are connected to a drive transmission mechanism connected to and driven by a single drive device.

20. A welding electrode tip dressing apparatus, for grinding a pair of electrode tips mounted on two opposite shanks and removing the electrode tips when they are spent, comprising:
    a tip grinding unit including a cutter having an aperture that receives a welding electrode tip, the cutter having two back-to-back grinding surfaces for grinding two opposing electrode tips simultaneously;
    a tip removal unit including a rotary board, a holding unit, and a combined rotation restrainer for selectively restraining the holding unit, the holding unit and the rotary board rotating relative to each other about a same axis, the holding unit having an aperture for receiving a welding electrode tip and holding a plurality of claws disposed around the aperture, the rotary board having an aperture for receiving the welding electrode tip and a plurality of radial slots disposed around the aperture with each slot receiving one of the claws which are made to move to selectively penetrate or release from the welding tip upon normal or reversed rotation of the rotary board relative to the holding unit when the combined rotation restrainer rotationally restrains the holding unit, the combined rotation restrainer including a pair of brake hooks oppositely disposed about a portion of the holding unit, the brake hooks being actuated to selectively close or open to selectively restrain or release the holding unit;
    wherein the tip grinding unit and the tip removal unit are arranged side-by side in an apparatus body and are connected to a drive transmission mechanism connected to and driven by a single drive device, the drive transmission mechanism including a plurality of speed reduction gears so that the cutter of the tip grinding unit and the rotary board of the tip removal unit are driven slower than the drive device.

* * * * *